350-467

OR 4,131,335

United States Patent [19]

Kimura

[11] 4,131,335

[45] Dec. 26, 1978

[54] PHOTOGRAPHIC LENS SYSTEM

[75] Inventor: Tadashi Kimura, Tokyo, Japan

[73] Assignee: Olympus Optical Co., Ltd., Tokyo, Japan

[21] Appl. No.: 780,090

[22] Filed: Mar. 22, 1977

[30] Foreign Application Priority Data

Mar. 23, 1976 [JP] Japan ............................. 51-31832
Mar. 4, 1977 [JP] Japan ............................. 52-23499

[51] Int. Cl.² .............................................. G02B 9/60
[52] U.S. Cl. ..................................... 350/218; 350/176
[58] Field of Search ................................. 350/218, 176

[56] References Cited

U.S. PATENT DOCUMENTS

| 2,683,396 | 7/1954 | Klemt et al. | 350/218 |
| 3,795,437 | 3/1974 | Sugiyama | 350/218 |
| 3,817,603 | 6/1974 | Takahashi | 350/218 |

FOREIGN PATENT DOCUMENTS

| 1018237 | 10/1957 | Fed. Rep. of Germany | 350/218 |
| 1118491 | 11/1961 | Fed. Rep. of Germany | 350/218 |
| 2224723 | 12/1972 | Fed. Rep. of Germany | 350/218 |
| 38-11587 | 7/1963 | Japan | 350/218 |
| 291256 | 9/1953 | Switzerland | 350/218 |
| 1422901 | 1/1976 | United Kingdom | 350/218 |

Primary Examiner—Paul A. Sacher
Attorney, Agent, or Firm—Cushman, Darby & Cushman

[57] ABSTRACT

A photographic lens system of modified Gauss type having five-component six-element lens configuration for which the field angle is 41° to 53°, aperture ratio is F1:2, overall length is short, back focal length is long and aberrations are corrected favorably.

16 Claims, 42 Drawing Figures

SPHERICAL ABERRATION

ASTIGMATISM

DISTORTION

FIG. 3A
SPHERICAL
ABERRATION
1:2.0
d  g
-0.01  0.01

FIG. 3B
ASTIGMATISM
21.6
Δs  Δm
-0.01  0.01

FIG. 3C
DISTORTION
21.6
-1  1 (%)

FIG. 4A
SPHERICAL
ABERRATION
1:2.0
d  g
-0.01  0.01

FIG. 4B
ASTIGMATISM
21.6
Δs  Δm
-0.01  0.01

FIG. 4C
DISTORTION
21.6
-1  1 (%)

SPHERICAL
ABERRATION

ASTIGMATISM

DISTORTION

SPHERICAL
ABERRATION

ASTIGMATISM

DISTORTION

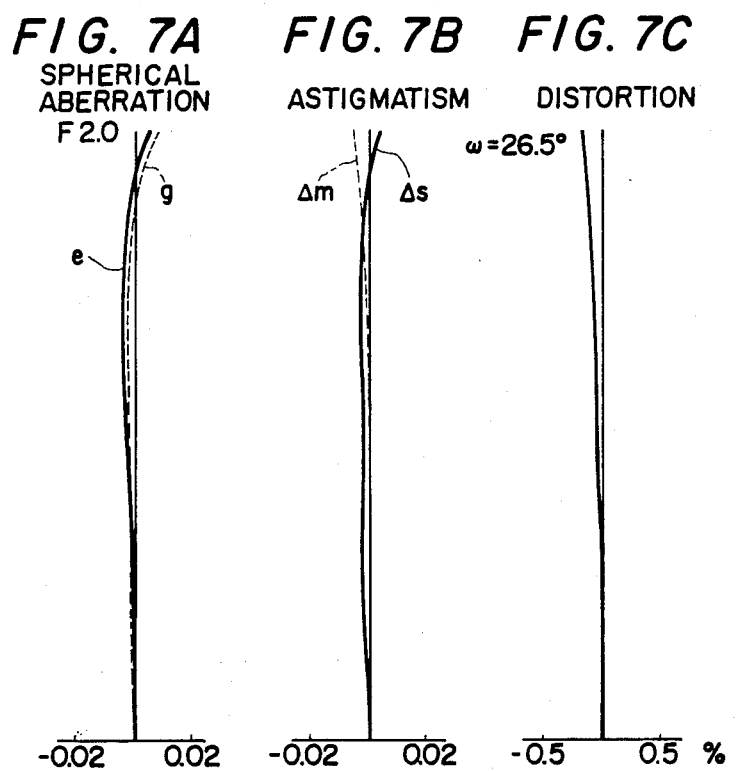
FIG. 7A SPHERICAL ABERRATION F 2.0
FIG. 7B ASTIGMATISM
FIG. 7C DISTORTION ω=26.5°
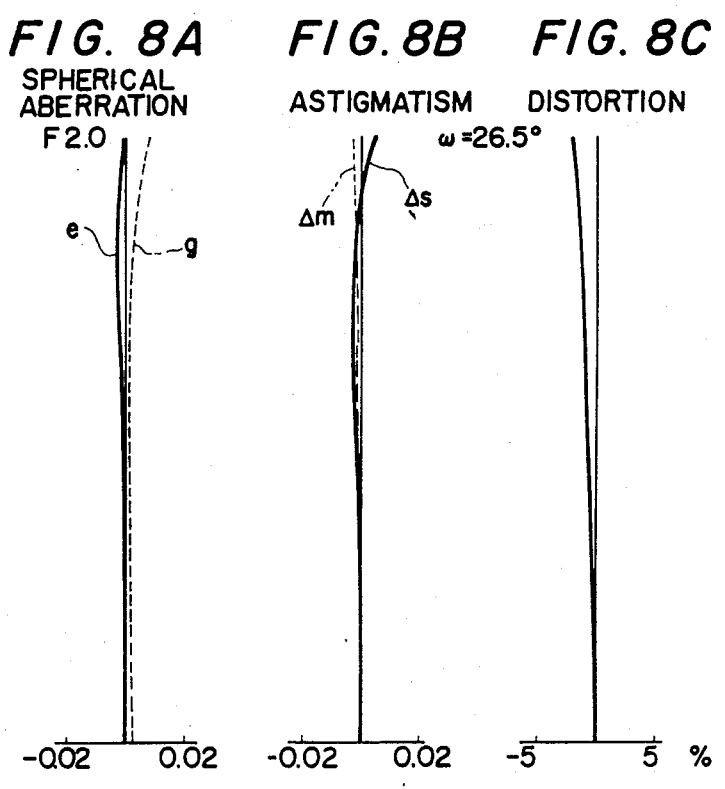
FIG. 8A SPHERICAL ABERRATION F 2.0
FIG. 8B ASTIGMATISM
FIG. 8C DISTORTION ω=26.5°

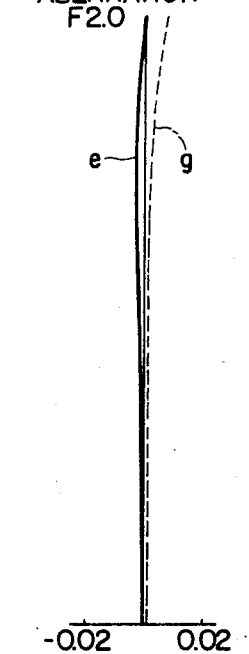
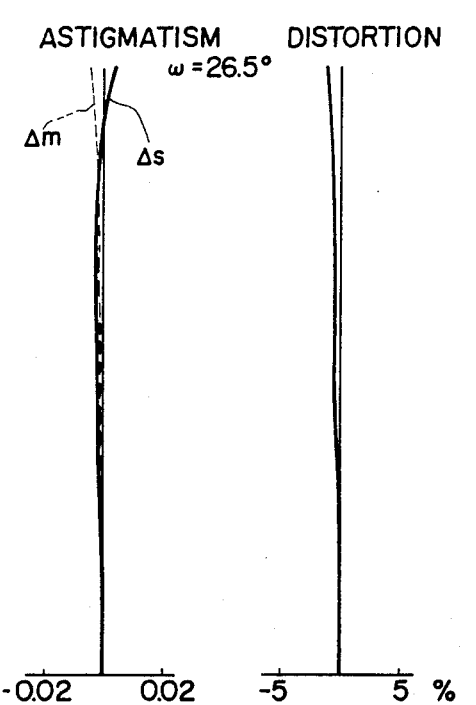
FIG. 9A
SPHERICAL ABERRATION
F2.0
FIG. 9B
ASTIGMATISM
ω=26.5°
FIG. 9C
DISTORTION
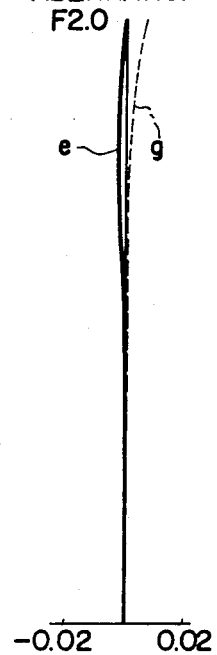
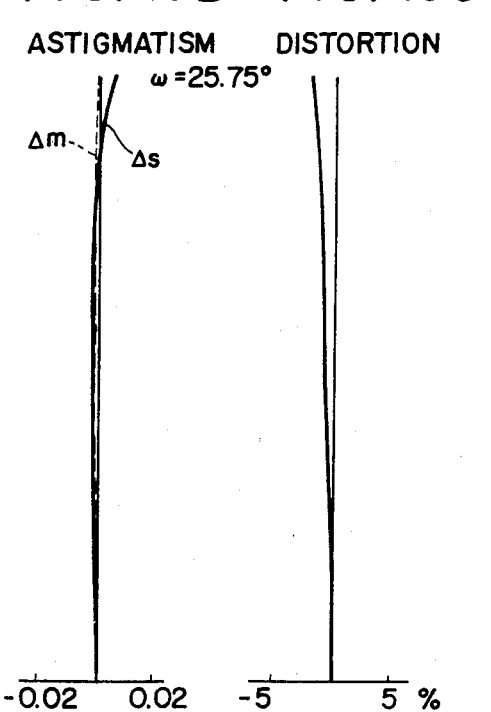
FIG. 10A
SPHERICAL ABERRATION
F2.0
FIG. 10B
ASTIGMATISM
ω=25.75°
FIG. 10C
DISTORTION

SPHERICAL ABERRATION
F1.8

−0.02    0.02

ASTIGMATISM
ω = 23.5°

−0.02    0.02

DISTORTION

−5    5   %

SPHERICAL ABERRATION
F1.8

−0.02    0.02

ASTIGMATISM
ω = 23.5°

−0.02    0.02

DISTORTION

−5    5   %

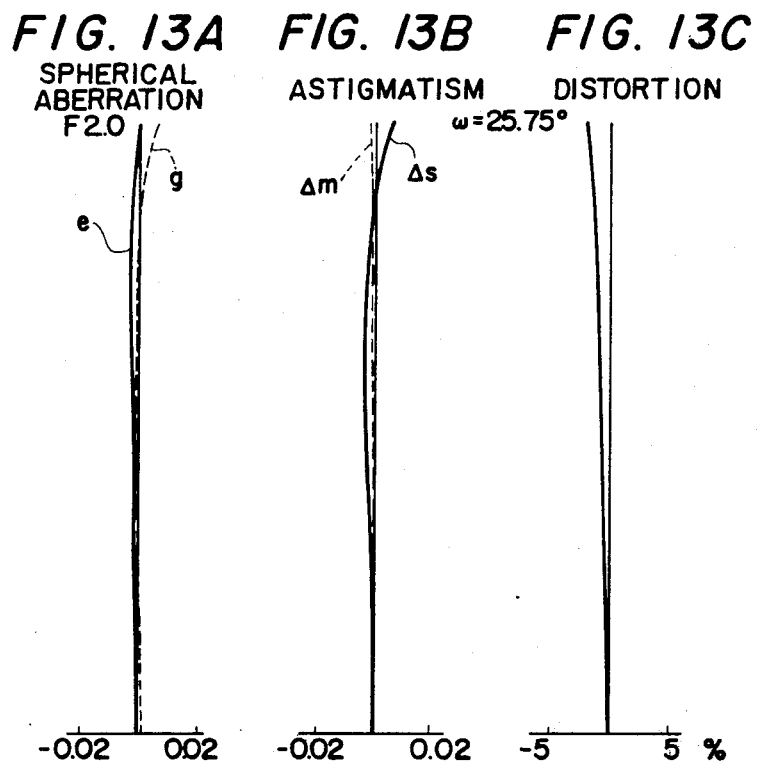
FIG. 13A SPHERICAL ABERRATION F2.0
FIG. 13B ASTIGMATISM ω=25.75°
FIG. 13C DISTORTION
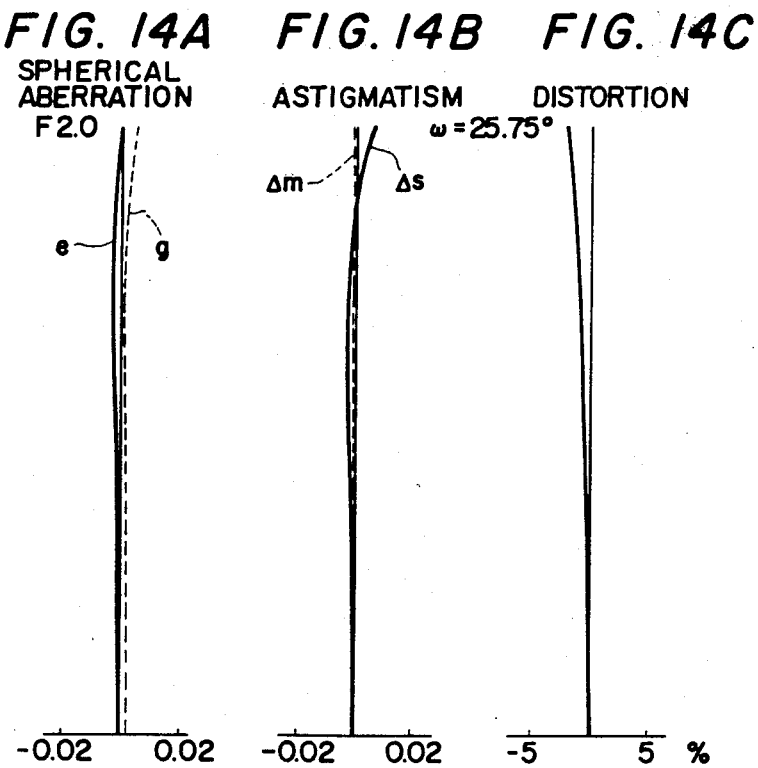
FIG. 14A SPHERICAL ABERRATION F2.0
FIG. 14B ASTIGMATISM ω=25.75°
FIG. 14C DISTORTION

PHOTOGRAPHIC LENS SYSTEM

BACKGROUND OF THE INVENTION a) Field of the Invention

The present invention relates to a standard photographic lens system and, more particularly, to a standard photographic lens system of modified Gauss type with the field angle of 41° to 53° and aperture ratio of F1:2.

b) Description of the prior art:

Cameras, especially single-lens reflex cameras, are recently becoming more and more compact and there is a demand for photographic lens systems which are more compact and lighter in weight. To meet such demand, it is required to provide a photographic lens system satisfying two different requirements which are contrary to each other, i.e., one is to make the distance from the front surface of the lens system to the film surface short and the other is to make the back focal length of the lens system long.

SUMMARY OF THE INVENTION

It is, therefore, a primary object of the present invention to provide a photographic lens system having a short overall length and long back focal length.

The photographic lens system according to the present invention is a modified Gauss type lens system of five-component six-element lens configuration as shown in FIG. 1 and comprises a front lens group comprising a first, second and third lens components and rear lens group comprising a fourth and fifth lens components. In the front lens group, the first lens components is a positive lens arranged convex toward the object side, the second lens component is also a positive meniscus lens arranged convex toward the object side, and the third lens component is a negative meniscus lens arranged convex toward the object side. In the rear lens group, the fourth lens component is a negative cemented meniscus doublet and the fifth lens component is a positive lens. Besides, the photographic lens system according to the present invention satisfies the following conditions when reference symbol $$\sum_{i=1}^{10} d_i$$

represents the length from the front surface of the lens system to the rear surface of the lens system, reference symbol $$\sum_{i=1}^{5} d_i$$

represents the length from the front surface of the lens system to the lens surface on the image side of the third lens component, reference symbol $r_8$ represents the radius of curvature of the cemented surface of the fourth lens component, reference symbols $n_4$ and $n_5$ respectively represent refractive indices of respective lenses constituting the fourth lens component, reference symbol $f_{12}$ represents the total focal length of the first and second lens components, and reference symbol f represents the focal length of the lens system as a whole.

$$\sum_{i=1}^{10} d_i < 0.6f \quad (1)$$

$$0.14f < \sum_{i=1}^{5} d_i < 0.2f \quad (2)$$

(3) $0.5 f < f_{12} < 0.6f$ (4) $r_8 < 0$ (5) $0 < n_5 - n_4$

Out of the above conditions, the condition (1) relates to the most important characteristic of the photographic lens system according to the present invention and shows that this lens system has a very short overall length which is almost unprecedented. Moreover, the photographic lens system according to the present invention is arranged to have a long back focal length. In the present invention, aggravations of aberrations which occur when the overall length is made short and back focal length is made long are corrected by establishing the conditions (2) through (5).

If, in the condition (2), $$\sum_{i=1}^{5} d_i$$

becomes larger than 0.2f, the back focal length will become short though spherical aberration will be corrected favourably. If it becomes smaller than 0.14f, the back focal length will become long. However, astigmatism in relation to spherical aberration will be overcorrected and this is not desirable. For known lens systems, aberrations are generally corrected by arranging so that the length from the front surface of the front lens group to the rear surface of the front lens group becomes long and that the length from the front surface of the rear lens group to the rear surface of the rear lens group becomes short. When the above correcting method is adopted, however, the back focal length becomes short and, moreover, it is difficult to make the overall length of the lens system short. In the present invention, the back focal length is made long by limiting the length of the front lens group to a small value as defined by the condition (2) and, at the same time, aberrations are favourably corrected in well balanced state by satisfying the conditions (3) through (5).

If $f_{12}$ in the condition (3) becomes larger than 0.6f spherical aberration of higher order will be overcorrected and flare will increase. If $f_{12}$ becomes smaller than 0.5f, Petzval's sum becomes a nevative value and, moreover, its absolute value becomes very large. As a result, curvature of field increases.

If $r_8$ in the condition (4) becomes a positive value, coma will be aggravated and lateral chromatic aberration will be overcorrected.

If $n_5 - n_4$ in the condition (5) becomes a negative value, lateral chromatic aberration will be undercorrected. If it is attempted to favourably correct lateral chromatic aberration by varying radii of curvature of respective lens surfaces, coma and astigmatism will be aggravated and it will become impossible to correct coma and astigmatism favourably.

Besides, the photographic lens system according to the present invention is arranged to further satisfy the following conditions for the purpose of attaining the object of the present invention, i.e., to provide a photographic lens system for which the overall length is short, aberrations are corrected favourably and, moreover, the back focal length is long.

(6) $0.9 < -f_3/f_{12} < 1.2$ (7) $0.6 < f_{56}/-f_4 < 0.85$ (8) $\epsilon_1 < 0.14f$ (9) $\epsilon_2 < 0.1f$ In the above conditions, reference symbol $f_{12}$ represents the total focal length of the first and second lens components, reference symbol $f_3$ represents the focal length of the third lens component, reference symbol $f_4$ represents the focal length of the lens on the object side in the fourth lens component, reference symbol $f_{56}$ represents the total focal length of the lens on the image side in the fourth lens component and of the fifth lens component, reference symbol $\epsilon_1$ represents the distance from the secondary principal point (principal point on the image side) of the first and second lens components to the primary principal point (principal point on the object side) of the third lens component, and reference symbol $\epsilon_2$ represents the distance from the secondary principal point of the lens on the object side in the fourth lens component to the primary principal point of the lens on the image side in the fourth lens component and of the fifth lens component. Out of the above conditions, the conditions (6) and (7) are established based on the idea as described below.

That is, for a lens system comprising a negative lens $L_n$ and a positive lens $L_p$ as shown in the FIG. 15, the relation between the focal lengths and heights of rays is expressed by the formula shown below when reference symbol $h_i$ represents the height of ray which enters the negative lens $L_n$, reference symbol $h_e$ represents the height of ray which goes out from the positive lens $L_p$, reference symbol $F_n$ represents the focal length of the negative lens $L_n$ reference symbol $F_p$ represents the focal length of the positive lens $L_p$.

$$K = \frac{h_e}{h_i} = \frac{F_p}{-F_n}$$

$$\sum_{i=1}^{10} d_i$$

Now, a Gauss type lens system may be supposed to comprise a front lens group arranged on the object side of the stop and comprising a positive lens $L_1$ and a negative lens $L_2$ and a rear lens group arranged on the image side of the stop and comprising a negative lens $L_3$ and a positive lens $L_4$ as shown in FIG. 16. In case of the above-mentioned Gauss type lens system, rays entered the lens system in parallel with the optical axis and passed through the front lens group become approximately parallel with the optical axis and are focused by the rear lens group. When only the front lens group of the above lens system is taken up and the idea described based on the lens system shown in FIG. 15 is applied to this front lens group, K becomes as follows:

$$K_1 = \frac{-F_2}{F_1} = \frac{h_1}{h_2}$$

wherein reference symbol $F_1$ represents the focal length of the positive lens $L_1$ on the object side in the front lens group, reference symbol $F_2$ represents the focal length of the negative lens $L_2$ in the front lens group, reference symbol $h_1$ represents the height of ray which enters the positive lens $L_1$, and reference symbol $h_2$ represents the height of ray which goes out from the negative lens $L_2$. When only the rear lens group of the above lens system is taken up and the same idea is applied to it, K becomes as follows in the same way as above:

$$K_2 = \frac{F_4}{-F_3} = \frac{h_3}{h_2}$$

wherein reference symbol $F_3$ represents the focal length of the negative lens $L_3$ in the rear lens group, reference symbol $F_4$ represents the focal length of the positive lens $L_4$ in the rear lens group, reference symbol $h_2$ represents the height of ray which enters the negative lens $L_3$, and reference symbol $h_3$ represents the height of ray which goes out from the positive lens $L_4$.

When $\omega_1$ and $h_1$ are decided as predetermined values in case of the lens system shown in FIG. 16, $h_2$ and $h_3$ are decided by $K_1$ and $K_2$ and, consequently, the back focal length $f_B$ of that lens system is also decided.

Based on the above-mentioned idea, the conditions (6) and (7) are established in the present invention. That is, the condition (6) defines the ratio $-f_3/f_{12}$ between the total focal length $f_{12}$ of the first and second lens components, which are the positive lenses in the front lens group, and the focal length $f_3$ of the third lens component, which is the negative lens in the front lens group. That is, the ratio $-f_3/f_{12}$ corresponds to the above-mentioned $K_1$. When, therefore, $-f_3/f_{12}$ becomes large, the height of ray which goes out from the front lens group, i.e., the value corresponding to $h_2$ in FIG. 16, becomes small when the height of ray which enters the front lens group, i.e., the value corresponding to $h_1$ in FIG. 16, is decided as a predetermined value. Consequently, when the value of $K_2$ for the rear lens group is predetermined, the back focal length of the lens system becomes small. Therefore, if $-f_3/f_{12}$ in the condition (6) becomes larger than 1.2, the back focal length becomes shorter than the desired value and this is not desirable. On the other hand, if $-f_3/f_{12}$ becomes smaller than 0.9, spherical aberration of higher order will be overcorrected and flare will increase though the back focal length can be made long.

In the same way as above, the condition (7) defines the ratio $f_{56}/-f_4$ between the focal length $f_4$ of the lens on the object side in the fourth lens component which is the negative lens in the rear lens group and the total focal length $F_{56}$ of the lens on the image side in the fourth lens component and of the fifth lens component which are the positive lenses in the rear lens group. That is the ratio $f_{56}/-f_4$ corresponds to $K_2$ in the description for the lens system shown in FIG. 16. When, therefore, the height of ray which corresponds to $h_1$ in FIG. 16 is decided as a predetermined value and the ratio $-f_3/f_{12}$ which corresponds to $K_1$ is also predetermined, the height of ray corresponding to $h_3$ in FIG. 16 becomes small when $f_{56}/-f_4$ becomes small. As a result, the back focal length becomes short. Therefore, if $f_{56}/-f_4$ in the condition (7) becomes smaller than 0.6, it becomes impossible to obtain the desired long back focal length. On the other hand, if $f_{56}/-f_4$ becomes larger than 0.85, astigmatism in relation to spherical aberration will be undercorrected though the back focal length becomes long.

Now, the conditions (8) and (9) are established in relation to the conditions (6) and (7). That is, even when the front lens group is arranged to satisfy the condition (6), the back focal length becomes short if the distance $\epsilon_1$ from the secondary principal point of the first and second lens components to the primary principal point of the third lens components becomes larger than the upper limit of the condition (8), i.e., 0.14f. As a result, it becomes impossible to attain the object of the present invention. In the same way, even when the rear lens group is arranged to satisfy the condition (7), astigmatism in relation to spherical aberration will be undercorrected if the distance $\epsilon_2$ from the secondary principal point of the lens on the object side in the fourth lens component to the primary principal point of the lens on the image side in the fourth lens component and of the fifth lens component becomes larger than the upper limit of the condition (9), i.e., 0.1f, though the back focal length becomes long in that case.

The object of the present invention is attained by the photographic lens system which is described so far. But, it is more preferably when the above photographic lens system further satisfies the following conditions.

(10) $1.8 < n_1, n_2$

(11) $35 < \nu_1, \nu_2$

(12) $0.5f < r_1 < 1.2f$

(13) $0.33f < r_3 < 0.42F$

(14) $0 < r_4/r_5 < 1.0$

In the above conditions, reference symbols $n_1$ and $n_2$ respectively represent refractive indices of the first and second lens components, reference symbols $\nu_1$ and $\nu_2$ respectively represent Abbe's numbers of the first and second lens components, reference symbol $r_1$ represents the radius of curvature of the surface on the object side of the first lens component, reference symbols $r_3$ and $r_4$ respectively represent radii of curvature of respective surfaces of the second lens component, and reference symbol $r_5$ represents the radius of curvature of the surface on the object side of the third lens component.

If $n_1$ or $n_2$ in the above condition (10) becomes smaller than 1.8, spherical aberration will be undercorrected. Moreover, even when it is attempted to correct coma and astigmatism by varying radii of curvature of respective lens surfaces, it is impossible to correct them favourably.

If $\nu_1$ or $\nu_2$ in the condition (11) becomes smaller than 35, longitudinal chromatic aberration will be undercorrected and lateral chromatic aberration will be overcorrected.

If $r_1$ in the condition (12) becomes larger than 1.2f, spherical aberration of higher order will be overcorrected and flare will increase. If $r_1$ becomes smaller than 0.5f, spherical aberration of higher order will be undercorrected and back focal length will become short.

If $r_3$ in the condition (13) becomes smaller than 0.33f, spherical aberration of higher order will be undercorrected and back focal length will become short. If $r_3$ becomes larger than 0.42f, Petzval's sum will become a negative value of large absolute value and, as a result, curvature of field increases.

If $r_4/r_5$ in the condition (14) becomes a negative value, coma will be aggravated. On the contrary, if $r_4/r_5$ becomes larger than 1.0, distortion will become a negative value of large absolute value.

BRIEF DESCRIPTION OF THE DRAWINGS

FIGS. 3A, 3B and 3C respectively show graphs illustrating aberration curves of Embodiment 2;

FIGS. 4A, 4B and 4C respectively show graphs illustrating aberration curves of Embodiment 3;

FIGS. 7A, 7B and 7C respectively show graphs illustrating aberration curves of Embodiment 6;

FIGS. 8A, 8B and 8C respectively show graphs illustrating aberration curves of Embodiment 7;

FIGS. 9A, 9B and 9C respectively show graphs illustrating aberration curves of Embodiment 8;

FIGS. 10A, 10B and 10C respectively show graphs illustrating aberration curves of Embodiment 9;

FIGS. 13A, 13B and 13C respectively show graphs illustrating aberration curves of Embodiment 12;

FIGS. 14A, 14B and 14C respectively show graphs illustrating aberration curves of Embodiment 14; are

DETAILED DESCRIPTION OF THE PREFERRED EMBODIMENTS

Figure 1:
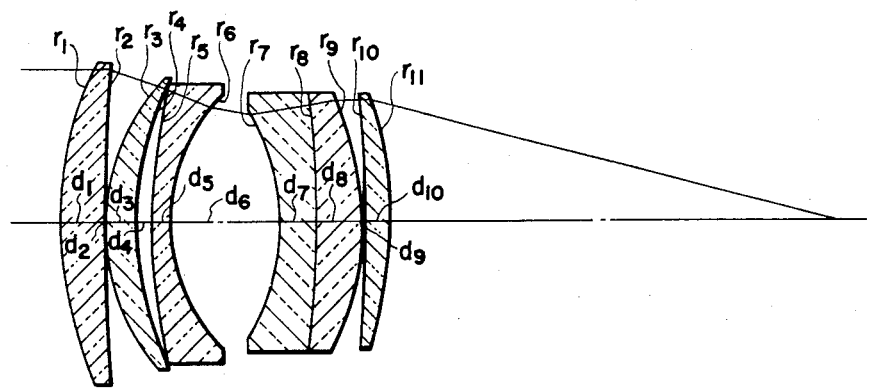
FIG. 1 shows a sectional view of the photographic lens system according to the present invention.
Figure 2A:
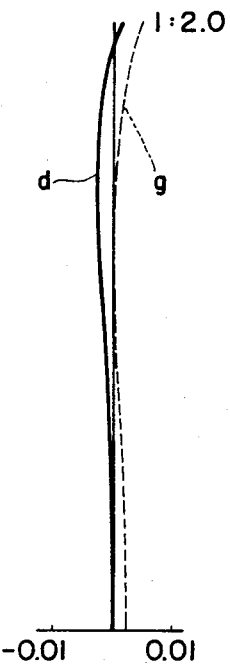
FIGS. 2A, 2B and 2C respectively show graphs illustrating aberration curves of Embodiment 1.
Figure 2B:
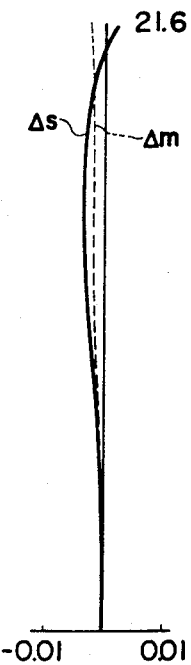
Figure 2C:
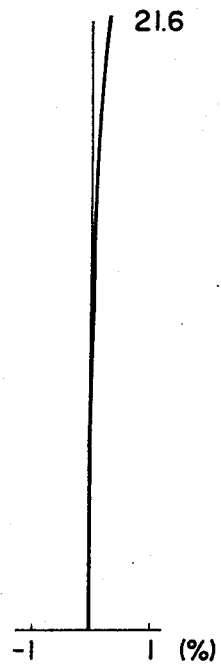
Figure 5A:
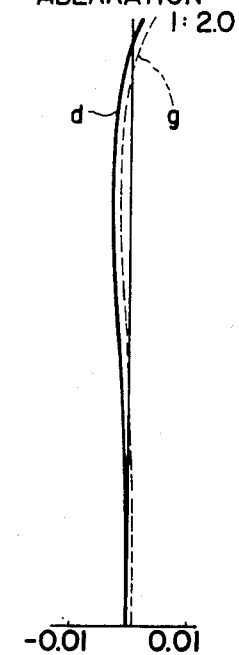
FIGS. 5A, 5B and 5C respectively show graphs illustrating aberration curves of Embodiment 4.
Figure 5B:
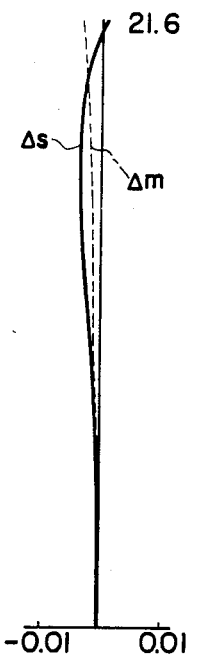
Figure 5C:
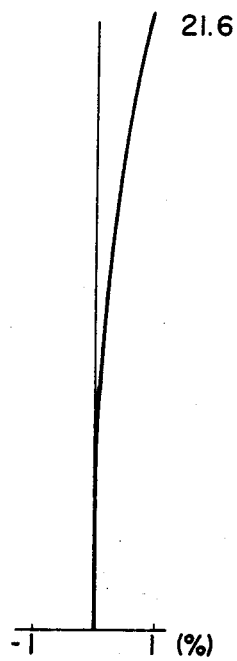
Figure 6A:
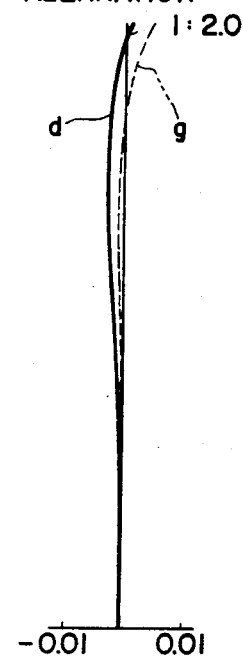
FIGS. 6A, 6B and 6C respectively show graphs illustrating aberration curves of Embodiment 5.
Figure 6B:
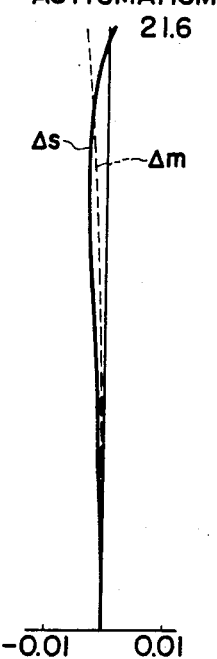
Figure 6C:
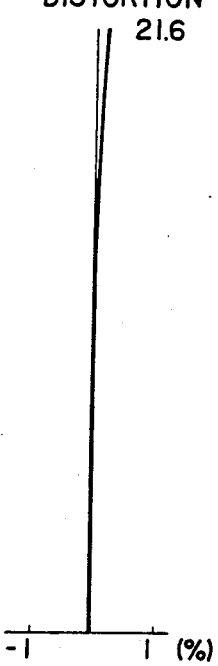
Figure 11A:
FIGS. 11A, 11B and 11C respectively show graphs illustrating aberration curves of Embodiment 10.
Figure 11B:
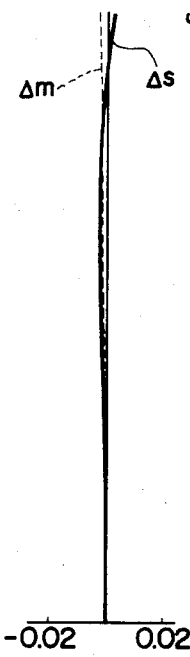
Figure 11C:
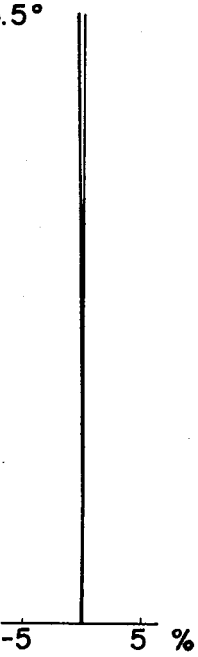
Figure 12A:
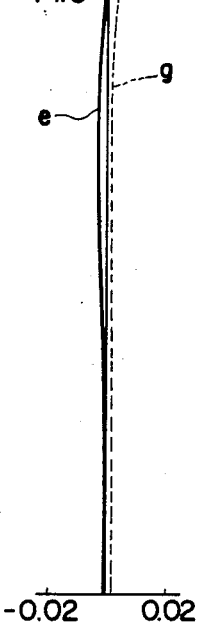
FIGS. 12A, 12B and 12C respectively show graphs illustrating aberration curves of Embodiment 11.
Figure 12B:
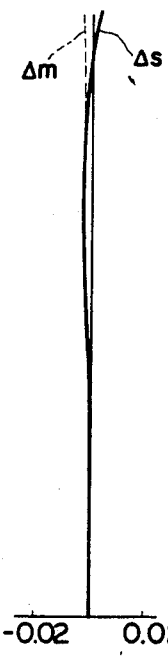
Figure 12C:
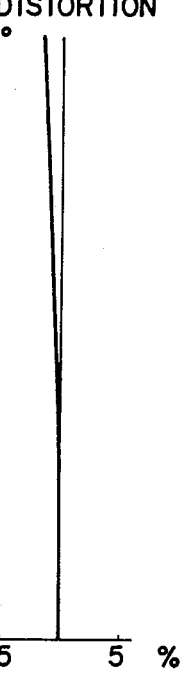
Figure 15:
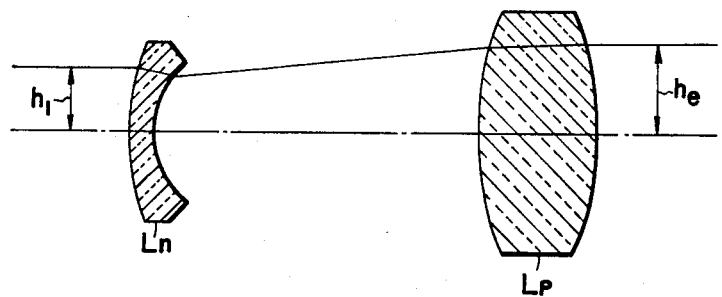
FIGS. 15 and 16 are figures for explanation of conditions (6) and (7).
Figure 16:
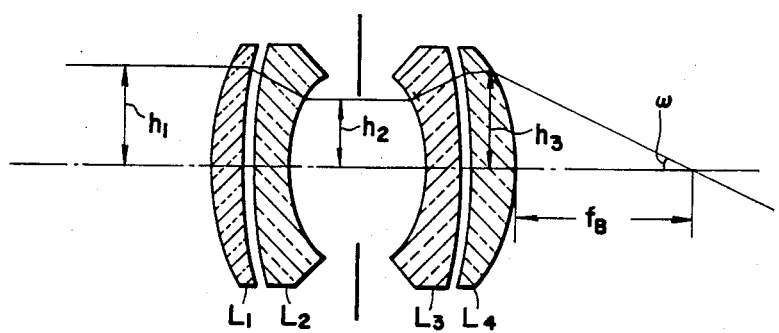

Preferred embodiments of the photographic lens system according to the present invention explained in the above are as shown below.

```
Embodiment 1
r_1 = 0.56
       d_1 = 0.006         n_1 = 1.7859       ν_1 = 44.1
r_2 = 4.829
       d_2 = 0.002
r_3 = 0.391
       d_3 = 0.055         n_2 = 1.7859       ν_2 = 44.1
r_4 = 0.557
       d_4 = 0.026
r_5 = 1.434
       d_5 = 0.031         n_3 = 1.7847       ν_3 = 26.22
r_6 = 0.301
       d_6 = 0.175
r_7 = -0.326
       d_7 = 0.051         n_4 = 1.64769      ν_4 = 33.8
r_8 = -0.818
       d_8 = 0.03          n_5 = 1.7725       ν_5 = 49.6
r_9 = -0.462
       d_9 = 0.002
r_10 = 22.701
       d_10 = 0 0.039      n_6 = 1.691        ν_6 = 54.84
r_11 = -0.677
                         10                5
f = 1, f_B = 0.750,     Σ  di = 0.52,    Σ  di = 0.18
                        i=1              i=1 f_12 = 0.513, n_5 - n_4 = 0.12481
```

| EMBODIMENT 2 | | |
|---|---|---|
| $r_1 = 0.625$ | | |
| $d_1 = 0.066$ | $n_1 = 1.8044$ | $\nu_1 = 39.62$ |
| $r_2 = 3.58$ | | |
| $d_2 = 0.002$ | | |
| $r_3 = 0.343$ | | |
| $d_3 = 0.053$ | $n_2 = 1.8044$ | $\nu_2 = 39.62$ |
| $r_4 = 0.512$ | | |
| $d_4 = 0.0022$ | | |
| $r_5 = 0.814$ | | |
| $d_5 = 0.031$ | $n_3 = 1.84666$ | $\nu_3 = 23.9$ |
| $r_6 = 0.277$ | | |
| $d_6 = 0.19$ | | |
| $r_7 = -0.335$ | | |
| $d_7 = 0.049$ | $n_4 = 1.68893$ | $\nu_4 = 31.08$ |
| $r_8 = -1.518$ | | |
| $d_8 = 0.077$ | $n_5 = 1.8061$ | $\nu_5 = 40.92$ |
| $r_9 = -0.495$ | | |
| $d_9 = 0.002$ | | |
| $r_{10} = -5.346$ | | |
| $d_{10} = 0.042$ | $n_6 = 1.734$ | $\nu_6 = 51.52$ |
| $r_{11} = -0.629$ | | |
| $f = 1, f_B = 0.736, \sum_{i=1}^{10} di = 0.534, \sum_{i=1}^{5} di = 0.174$ | | |
| $f_{12} = 0.51, n_5 - n_4 = 0.11717$ | | |

| EMBODIMENT 3 | | |
|---|---|---|
| $r_1 = 0.535$ | | |
| $d_1 = 0.057$ | $n_1 = 1.79952$ | $\nu_1 = 42.24$ |
| $r_2 = 2.422$ | | |
| $d_2 = 0.002$ | | |
| $r_3 = 0.348$ | | |
| $d_3 = 0.037$ | $n_2 = 1.8061$ | $\nu_2 = 40.92$ |
| $f_4 = 0.485$ | | |
| $d_4 = 0.030$ | | |
| $r_5 = 0.827$ | | |
| $d_5 = 0.023$ | $n_3 = 1.7847$ | $\nu_3 = 26.22$ |
| $r_6 = 0.276$ | | |
| $d_6 = 0.222$ | | |
| $r_7 = -0.311$ | | |
| $d_7 = 0.046$ | $n_4 = 1.68893$ | $\nu_4 = 31.08$ |
| $r_8 = -10.647$ | | |
| $d_8 = 0.076$ | $n_5 = 1.8061$ | $\nu_5 = 40.92$ |
| $r_9 = -0.406$ | | |
| $d_9 = 0.002$ | | |
| $r_{10} = -21.108$ | | |
| $d_{10} = 0.045$ | $n_6 = 1.734$ | $\nu_6 = 51.52$ |
| $r_{11} = -0.935$ | | |
| $f = 1, f_B = 0.751, \sum_{i=1}^{10} di = 0.54, \sum_{i=1}^{5} di = 0.149$ | | |
| $f_{12} = 0.521, n_5 - n_4 = 0.11717$ | | |

| EMBODIMENT 4 | | |
|---|---|---|
| $r_1 = 0.628$ | | |
| $d_1 = 0.066$ | $n_1 = 1.7859$ | $\nu_1 = 44.1$ |
| $r_2 = 5.287$ | | |
| $d_2 = 0.002$ | | |
| $r_3 = 0.374$ | | |
| $d_3 = 0.055$ | $n_2 = 1.7859$ | $\nu_2 = 0.44.1$ |
| $r_4 = 0.556$ | | |
| $d_4 = 0.026$ | | |
| $r_5 = 1.103$ | | |
| $d_5 = 0.031$ | $n_3 = 1.7847$ | $\nu_3 = 26.22$ |
| $r_6 = 0.298$ | | |
| $d_6 = 0.181$ | | |
| $r_7 = -0.310$ | | |
| $d_7 = 0.046$ | $n_4 = 1.68893$ | $\nu_4 = 31.08$ |
| $r_8 = -0.694$ | | |
| $d_8 = 0.074$ | $n_5 = 1.7859$ | $\nu_5 = 44.1$ |
| $r_9 = -0.423$ | | |
| $d_9 = 0.002$ | | |
| $r_{10} = -15.576$ | | |
| $d_{10} = 0.04$ | $n_6 = 1.6968$ | $\nu_6 = 55.52$ |
| $n_{11} = -0.693$ | | |
| $f = 1, f_B = 0.747, \sum_{i=1}^{10} di = 0.523, \sum_{i=1}^{5} di = 0.18$ | | |
| $f_{12} = 0.528, n_5 - n_4 = 0.09697$ | | |

| EMBODIMENT 5 | | |
|---|---|---|
| $r_1 = 0.622$ | | |
| $d_1 = 0.061$ | $n_1 = 1.79952$ | $\nu_1 = 42.24$ |
| $r_2 = 3.373$ | | |
| $d_2 = 0.002$ | | |
| $r_3 = 0.338$ | | |
| $d_3 = 0.047$ | $n_2 = 1.79952$ | $\nu_2 = 42.24$ |
| $r_4 = 0.482$ | | |
| $d_4 = 0.026$ | | |
| $r_5 = 0.827$ | | |
| $d_5 = 0.021$ | $n_3 = 1.7847$ | $\nu_3 = 26.22$ |
| $r_6 = 0.281$ | | |
| $d_6 = 0.202$ | | |
| $r_7 = -0.32$ | | |
| $d_7 = 0.044$ | $n_4 = 1.68893$ | $\nu_4 = 31.08$ |
| $r_8 = -9.853$ | | |
| $d_8 = 0.073$ | $n_5 = 1.8061$ | $\nu_5 = 40.92$ |
| $r_9 = -0.409$ | | |
| $d_9 = 0.002$ | | |
| $r_{10} = -11.767$ | | |
| $d_{10} = 0.052$ | $n_6 = 1.757$ | $\nu_6 = 47.87$ |
| $r_{11} = -0.967$ | | |
| $f = 1, f_B = 0.751, \sum_{i=1}^{10} di = 0.53, \sum_{i=1}^{5} di = 0.157$ | | |
| $f_{12} = 0.532, n_5 - n_4 = 0.11717$ | | |

| EMBODIMENT 6 | | |
|---|---|---|
| $r_1 = 1.1733$ | | |
| $d_1 = 0.0623$ | $n_1 = 1.80922$ | $\nu_1 = 39.62$ |
| $r_2 = 69.3990$ | | |
| $d_2 = 0.0023$ | | |
| $r_3 = 0.3825$ | | |
| $d_3 = 0.0449$ | $n_2 = 1.83922$ | $\nu_2 = 37.19$ |
| $r_4 = 0.7111$ | | |
| $d_4 = 0.0307$ | | |
| $r_5 = 1.3147$ | | |
| $d_5 = 0.0223$ | $n_3 = 1.74618$ | $\nu_3 = 28.29$ |
| $r_6 = 0.3059$ | | |
| $d_6 = 0.2762$ | | |
| $r_7 = -0.2793$ | | |
| $d_7 = 0.0228$ | $n_4 = 1.70443$ | $\nu_4 = 30.12$ |
| $r_8 = -0.7955$ | | |
| $d_8 = 0.0743$ | $n_5 = 1.80811$ | $\nu_5 = 46.57$ |
| $r_9 = -0.3599$ | | |
| $d_9 = 0.0023$ | | |
| $r_{10} = -5.0535$ | | |
| $d_{10} = 0.0600$ | $n_6 = 1.73234$ | $\nu_6 = 54.68$ |
| $r_{11} = -0.6303$ | | |
| $f = 1.0,$ | $f_B = 0.8591,$ | $\sum_{i=1}^{10} di = 0.5978$ |
| $\sum_{i=1}^{5} di = 0.1625'$ | $f_{12} = 0.5720,$ | $f_3 = 0.5390$ |
| $-f_3/f_{12} = 0.9423,$ | $f_4 = -0.6220$ | |
| $f_{56} = 0.4287$ | $f_{56}/-f_4 = 0.6892$ | |
| $n_5 - n_4 = 0.10368,$ | $r_4/r_5 = 0.5409$ | |
| $\epsilon_1 = 0.1013,$ | $>\epsilon_2 = 0.0951$ | |

| EMBODIMENT 7 | | |
|---|---|---|
| $r_1 = 1.0296$ | | |
| $d_1 = 0.0764$ | $n_1 = 1.81077$ | $\nu_1 = 40.95$ |
| $r_2 = -26.4109$ | | |
| $d_2 = 0.0023$ | | |
| $r_3 = 0.4071$ | | |
| $d_3 = 0.0456$ | $n_2 = 1.81077$ | $\nu_2 = 40.95$ |
| $r_4 = 0.7213$ | | |
| $d_4 = 0.0269$ | | |
| $r_5 = 2.3068$ | | |
| $d_5 = 0.0227$ | $n_3 = 1.70443$ | $\nu_3 = 30.12$ |
| $r_6 = 0.3311$ | | |
| $d_6 = 0.2426$ | | |
| $r_7 = -0.2981$ | | |
| $d_7 = 0.0227$ | $n_4 = 1.74618$ | $\nu_4 = 28.29$ |
| $r_8 = -1.0049$ | | |
| $d_8 = 0.0838$ | $n_5 = 1.79013$ | $\nu_5 = 44.18$ |
| $r_9 = -0.3617$ | | |
| $d_9 = 0.0023$ | | |
| $r_{10} = -17.5662$ | | |
| $d_{10} = 0.0523$ | $n_6 = 1.71615$ | $\nu_6 = 53.89$ |
| $r_{11} = -0.7886$ | | |
| $f = 1.0$ | $f_B = 0.8591$ | $\sum_{i=1}^{10} d_i = 0.5775$ |

EMBODIMENT 7

$\sum_{i=1}^{5} d_i = 0.1739$   $f_{12} = 0.5770$   $f_3 = -0.5510$
$-f_3/f_{12} = 0.9549,$   $f_4 = -0.5760$
$f_{56} = 0.4137,$   $f_{56}/-f_4 = 0.7182$
$r_4/r_5 = 0.3129,$   $\epsilon_1 = 0.1026$
$\epsilon_2 = 0.0905$

EMBODIMENT 8

$r_1 = 0.8774$
  $d_1 = 0.0909$   $n_1 = 1.80811$   $\nu_1 = 46.57$
$r_2 = 45.5773$
  $d_2 = 0.0023$
$r_3 = 0.4176$
  $d_3 = 0.0455$   $n_2 = 1.80811$   $\nu_2 = 46.57$
$r_4 = 0.6872$
  $d_4 = 0.0273$
$r_5 = 2.3074$
  $d_5 = 0.0228$   $n_3 = 1.75453$   $\nu_3 = 34.27$
$r_6 = 0.3454$
  $d_6 = 0.2275$
$r_7 = -0.2753$
  $d_7 = 0.0227$   $n_4 = 1.74618$   $\nu_4 = 28.29$
$r_8 = -0.7453$
  $d_8 = 0.0732$   $n_5 = 1.79195$   $\nu_5 = 47.43$
$r_9 = -0.3401$
  $d_9 = 0.0023$
$r_{10} = 23.5596$
  $d_{10} = 0.0566$   $n_6 = 1.71615$   $\nu_6 = 53.89$
$r_{11} = -0.7118$ $f = 1.0,$   $f_B = 0.8590,$   $\sum_{i=1}^{10} d_i = 0.5719$ $\sum_{i=1}^{5} d_i = 0.1881,$   $f_{12} = 0.585,$   $f_3 = -0.5410$
$-f_3/12 = 0.9248,$   $f_4 = -0.5970,$
$f_{56} = 0.4169,$   $f_{56}/-f_4 = 0.6983$
$n_5 - n_4 = 0.04577,$   $r_4/r_5 = 0.2978$
$\epsilon_1 = 0.1115,$   $\epsilon_2 = 0.0918$

EMBODIMENT 9

$r_1 = 0.9182$
  $d_1 = 0.0497$   $n_1 = 1.80922$   $\nu_1 = 39.62$
$r_2 = 9.0961$
  $d_2 = 0.0022$
$r_3 = 0.3759$
  $d_3 = 0.0542$   $n_2 = 1.83932$   $\nu_2 = 37.19$
$r_4 = 0.5991$
  $d_4 = 0.0241$
$r_5 = 1.2475$
  $d_5 = 0.0216$   $n_3 = 1.76843$   $\nu_3 = 27.11$
$r_6 = 0.3211$
  $d_6 = 0.2182$
$r_7 = -0.2958$
  $d_7 = 0.0222$   $n_4 = 1.70443$   $\nu_4 = 30.12$
$r_8 = -3.9426$
  $d_8 = 0.0862$   $n_5 = 1.80401$   $\nu_5 = 42.24$
$r_9 = -0.3745$
  $d_9 = 0.0022$
$r_{10} = 98.8977$
  $d_{10} = 0.0322$   $n_6 = 1.76076$   $\nu_6 = 47.87$
$r_{11} = -0.9124$ $f = 1.0,$   $f_B = 0.8399,$   $\sum_{i=1}^{10} d_i = 0.5139$ $\sum_{i=1}^{5} d_i = 0.1518,$   $f_{12} = 0.5790,$
$f_3 = -0.568,$   $-f_3/f_{12} = 0.9810$
$f_4 = -0.455,$   $f_{56} = 0.3599$
$f_{56}/-f_4 = 0.7910$   $n_5 - n_4 = 0.09958$
$r_4/r_5 = 0.4802,$   $\epsilon_1 = 0.1064$   $\epsilon_2 = 0.0712$

EMBODIMENT 10

$r_1 = 0.5886$
  $d_1 = 0.0700$   $n_1 = 1.80922$   $\nu_1 = 39.62$
$r_2 = 2.1104$
  $d_2 = 0.0020$
$r_3 = 0.3385$
  $d_3 = 0.0444$   $n_2 = 1.83945$   $\nu_2 = 42.72$
$r_4 = 0.4748$

EMBODIMENT 10 -continued $d_4 = 0.0256$
$r_5 = 0.7149$
  $d_5 = 0.0195$   $n_3 = 1.79177$   $\nu_3 = 26.22$
$r_6 = 0.2678$
  $d_6 = 0.2500$
$r_7 = -0.2793$
  $d_7 = 0.0189$   $n_4 = 1.70443$   $\nu_4 = 30.12$
$r_8 = -4.7249$
  $d_8 = 0.0873$   $n_5 = 1.80922$   $\nu_5 = 39.62$
$r_9 = -0.3486$
  $d_9 = 0.0020$
$r_{10} = 62.2371$
  $d_{10} = 0.0328$   $n_6 = 1.76076$   $\nu_6 = 47.87$
$r_{11} = -1.0361$ $f = 0.1,$   $f_B = 0.7565,$   $\sum_{i=1}^{10} d_i = 0.5524$ $\sum_{i=1}^{5} d_i = 0.1615,$   $f_{12} = 0.5470,$   $f_3 = -0.551$
$-f_3/f_{12} = 1.0073,$   $f_4 = -0.422$
$f_{56} = 0.3462,$   $f_{56}/-f_4 = 0.8204$
$n_5 - n_4 = 0.10479,$   $r_4/r_5 = 0.6641$
$\epsilon_1 = 0.1178,$   $\epsilon_2 = 0.0677$

EMBODIMENT 11

$r_1 = 0.5715$
  $d_1 = 0.0894$   $n_1 = 1.81077$   $\nu_1 = 40.95$
$r_2 = 2.5341$
  $d_2 = 0.0020$
$r_3 = 0.3809$
  $d_3 = 0.0468$   $n_2 = 1.81077$   $\nu_2 = 40.95$
$r_4 = 0.5125$
  $d_4 = 0.0291$
$r_5 = 1.0418$
  $d_5 = 0.0204$   $n_3 = 1.79192$   $\nu_3 = 25.71$
$r_6 = 0.3070$
  $d_6 = 0.2184$
$r_7 = -0.3060$
  $d_7 = 0.0212$   $n_4 = 1.70443$   $\nu_4 = 30.12$
$r_8 = -7.3319$
  $d_8 = 0.1014$   $n_5 = 1.81077$   $\nu_5 = 40.95$
$r_9 = -0.3949$
  $d_9 = 0.0020$
$r_{10} = 2.9394$
  $d_{10} = 0.0453$   $n_6 = 1.76076$   $\nu_6 = 47.87$
$r_{11} = -1.3192$ $f = 1.0,$   $f_B = 0.7560,$   $\sum_{i=1}^{10} d_i = 0.5759$ $\sum_{i=1}^{5} d_i = 0.1877,$   $f_{12} = 0.5700,$   $f_3 = 0.556$
$-f_3/f_{12} = 0.9754,$   $f_4 = -0.454$
$f_{56} = 0.3623,$   $f_{56}/-f_4 = 0.7980,$   $n_5 - n_4 = 0.10634$
   $r_4/r_5 = 0.4919$
$\epsilon_1 = 0.1322,$   $\epsilon_2 = 0.0768$

EMBODIMENT 12

$r_1 = 0.8965$
  $d_1 = 0.0820$   $n_1 = 1.80922$   $\nu_1 = 39.62$
$r_2 = 27.8344$
  $d_2 = 0.0022$
$r_3 = 0.4067$
  $d_3 = 0.0509$   $n_2 = 1.80401$   $\nu_2 = 42.24$
$r_4 = 0.6499$
  $d_4 = 0.0309$
$r_5 = 2.0122$
  $d_5 = 0.0242$   $n_3 = 1.72734$   $\nu_3 = 29.24$
$r_6 = 0.3342$
  $d_6 = 0.2196$
$r_7 = -0.3022$
  $d_7 = 0.0227$   $n_4 = 1.74618$   $\nu_4 = 28.29$
$r_8 = -1.6884$
  $d_8 = 0.0833$   $n_5 = 1.80922$   $\nu_5 = 39.62$
$r_9 = -0.3945$
  $d_9 = 0.0022$
$r_{10} = \infty$
  $d_{10} = 0.0556$   $n_6 = 1.71615$   $\nu_6 = 53.89$
$r_{11} = -0.6647$ $f = 1.0,$   $f_B = 0.8400,$   $\sum_{i=1}^{10} d_i = 0.5736$ $\sum_{i=1}^{5} d_i = 0.1902,$   $f_{12} = 0.5990,$   $f_3 = 0.558$ -continued

EMBODIMENT 12

| | |
|---|---|
| $-f_3/f_{12} = 0.9316$, | $f_4 = -0.501$ |
| $f_{56} = 0.3762$, | $f_{56}/-f_4 = 0.7509$ |
| $n_5 - n_4 = 0.06304$, | $r_4/r_5 = 0.3230$ |
| $\epsilon_1 = 0.1200$, | $\epsilon_2 = 0.0829$ |

EMBODIMENT 13

| | | |
|---|---|---|
| $r_1 = 0.7303$ | | |
| $d_1 = 0.0592$ | $n_1 = 1.83932$ | $\nu_1 = 37.19$ |
| $r_2 = 7.5746$ | | |
| $d_2 = 0.0022$ | | |
| $r_3 = 0.4184$ | | |
| $d_3 = 0.0477$ | $n_2 = 1.83932$ | $\nu_2 = 37.19$ |
| $r_4 = 0.6068$ | | |
| $d_4 = 0.0303$ | | |
| $r_5 = 1.8122$ | | |
| $d_5 = 0.0240$ | $n_3 = 1.79192$ | $\nu_3 = 25.71$ |
| $r_6 = 0.3432$ | | |
| $d_6 = 0.2194$ | | |
| $r_7 = -0.3075$ | | |
| $d_7 = 0.0322$ | $n_4 = 1.72311$ | $\nu_4 = 29.51$ |
| $r_8 = -1.2595$ | | |
| $d_8 = 0.0800$ | $n_5 = 1.79013$ | $\nu_5 = 44.18$ |
| $r_9 = -0.4037$ | | |
| $d_9 = 0.0022$ | | |
| $r_{10} = -50.5607$ | | |
| $d_{10} = 0.0582$ | $n_6 = 1.75844$ | $\nu_6 = 52.33$ |
| $r_{11} = -0.7067$ | | |
| $f = 1.0$, | $f_B = 0.8385$, | $\sum_{i=1}^{10} d_i = 0.5556$ |
| $\sum_{i=1}^{5} d_i = 0.1634$, | $f_{12} = 0.5710$, | $f_3 = -0.539$ |
| $-f_3/f_{12} = 0.9440$, | $f_4 = -0.571$ | |
| $f_{56} = 0.4131$, | $f_{56}/-f_4 = 0.7235$ | |
| $n_5 - n_4 = 0.06702$, | $r_4/r_5 = 0.3348$ | |
| $\epsilon_1 = 0.1136$, | $\epsilon_2 = 0.0951$ | |

In the above embodiments, reference symbols $r_1$ through $r_{11}$ respectively represent radii of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, and reference symbol $f_B$ represents the back focal length of the lens system.

Out of the above embodiments, Embodiments 6 through 13 are designed based on e-line. Though the numerical values of n and $\nu$ for Embodiments 1 through 5 are all for d-line, the numerical values of n and $\nu$ for Embodiments 6 through 13 are all for e-line. Besides, graphs of aberration curves for Embodiments 6 through 13 are drawn based on e-line.

As it is evident from the explanation given so far and respective embodiments, the photographic lens system according to the present invention is arranged so that the overall length is short by making the length from the front surface of the front lens group to the rear surface of the front lens group short and, at the same time, that the back focal length is long. Besides, as it is evident from the graphs illustrating aberration curves of respective embodiments, the photographic lens system according to the present invention is a high-performance photographic lens system.

I claim:

1. A photographic lens system comprising a first, second, third, fourth and fifth lens components, said first lens component being a positive lens with its convex surface postioned toward the object side, said second lens component being a positive meniscus lens with its convex surface positioned toward the object side, said third lens components being a negative meniscus lens with its convex surface positioned toward the object side, said fourth lens component being a negative cemented meniscus doublet with its concave surface positioned toward the object side, said fifth lens component being a positive lens, said photographing lens system satisfying the following conditions:

$$0.51f < \sum_{i=1}^{10} d_i < 0.58f \quad (1)$$

$$0.14f < \sum_{i=1}^{5} d_i < 0.2f \quad (2)$$

(3) $0.5f < f_{12} < 0.6f$ (4) $-10.7 < r_8 < -0.6$ (5) $0.04 < n_5 - n_4 < 0.13$ wherein reference symbol $$\sum_{i=1}^{10}$$

$d_i$ represents the overall length of the lens system, reference symbol $$\sum_{i=1}^{5}$$

$d_i$ represents the length from the surface on the object side of the first lens component to the surface on the image side of the third lens component, reference symbol $f_{12}$ represents the total focal length of the first and second lens components, reference symbol $r_8$ represents the radius of curvature of the cemented surface of the fourth lens component, reference symbols $n_4$ and $n_5$ respectively represent refractive indices of respective lenses constituting the fourth lens component, and reference symbol $f$ represents the focal length of the lens system as a whole.

2. A photographic lens system according to claim 1 further satisfying the following conditions:

(6) $0.9 < -f_3/f_{12} < 1.2$ (7) $0.6 < f_{56}/-f_4 < 0.85$ (8) $0.10f < \epsilon_1 < 0.13f$ (9) $0.06f < \epsilon_2 < 0.13f$ wherein reference symbol $f_{12}$ represents the total focal length of the first and second lens components, reference symbol $f_3$ represents the focal length of the third lens component, reference symbol $f_4$ represents the focal length of the lens on the object side in the fourth lens component, reference symbol $f_{56}$ represents the total focal length of the lens on the image side in the fourth lens component and of the fifth lens component, reference symbol $\epsilon_1$ represents the distance from the secondary principal point of the first and second lens components to the primary principal point of the third lens component, and reference symbol $\epsilon_2$ represents the distance from the secondary principal point of the lens on the object side in the fourth lens component to the primary principal point of the lens on the image side in the fourth lens component and of the fifth lens component.

3. A photographic lens system according to claim 2 further satisfying the following conditions:

(10) $1.8 < n_1, n_2 < 1.84$

(11) $35 < \nu_1, \nu_2 < 47$

(12) $0.5f < r_1 < 1.2f$

(13) $0.33f < r_3 < 0.42f$

(14) $0 < r_4/r_5 < 1.0$ wherein reference symbols $n_1$ and $n_2$ respectively represent refractive indices of the first and second lens components, reference symbols $\mu_1$ and $\mu_2$ respectively represent Abbe's numbers of the first and second lens components, reference symbol $r_1$ represents the radius of curvature of the surface on the object side of the first lens component, reference symbols $r_3$ and $r_4$ respectively represent radii of curvature of respective surfaces of the second lens component, and reference symbol $r_5$ represents the radius of curvature of the surface on the object side of the third lens component.

4. A photographic lens system according to claim 1, in which said photographic lens system has the following numerical data:

| | | | |
|---|---|---|---|
| $r_1 = 0.56$ | | | |
| $d_1 = 0.066$ | $n_1 = 1.7859$ | $\nu_1 = 44.1$ | |
| $r_2 = 4.829$ | | | |
| $d_2 = 0.002$ | | | |
| $r_3 = 0.391$ | | | |
| $d_3 = 0.055$ | $n_2 = 1.7859$ | $\nu_2 = 44.1$ | |
| $r_4 = 0.357$ | | | |
| $d_4 = 0.026$ | | | |
| $r_5 = 1.434$ | | | |
| $d_5 = 0.031$ | $n_3 = 1.7847$ | $\nu_3 = 26.22$ | |
| $r_6 = 0.301$ | | | |
| $d_6 = 0.175$ | | | |
| $r_7 = -0.326$ | | | |
| $d_7 = 0.051$ | $n_4 = 1.64769$ | $\nu_4 = 33.8$ | |
| $r_8 = -0.818$ | | | |
| $d_8 = 0.073$ | $n_5 = 1.7725$ | $\nu_5 = 49.6$ | |
| $r_9 = -0.462$ | | | |
| $d_9 = 0.002$ | | | |
| $r_{10} = 22.701$ | | | |
| $d_{10} = 0.039$ | $n_6 = 1.691$ | $\nu_6 = 54.84$ | |
| $r_{11} = -0.677$ | | | |
| $f = 1, f_B = 0.750,$ | $\sum_{i=1}^{10} d_i = 0.52,$ | $\sum_{i=1}^{5} d_i = 0.18$ | |
| $f_{12} = 0.513,$ | $n_5 - n_4 = 0.12481$ | | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses for d-line reference, symbols $\nu_1$ through $\nu_6$ respectively represent Abbe's numbers of respective lenses for d-line, reference symbol f represents the focal length of the lens system as a whole, reference symbol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components.

5. A photographic lens system according to claim 1, in which said photographic lens system has the following numerical data:

| | | | |
|---|---|---|---|
| $r_1 = 0.625$ | | | |
| $d_1 = 0.066$ | $n_1 = 1.8044$ | $\nu_1 = 39.62$ | |
| $r_2 = 3.58$ | | | |
| $d_2 = 0.002$ | | | |
| $r_3 = 0.343$ | | | |
| $d_3 = 0.053$ | $n_2 = 1.8044$ | $\nu_2 = 39.62$ | |
| $r_4 = 0.512$ | | | |
| $d_4 = 0.0022$ | | | |
| $r_5 = 0.814$ | | | |
| $d_5 = 0.031$ | $n_3 = 1.84666$ | $\nu_3 = 23.9$ | |
| $r_6 = 0.277$ | | | |
| $d_6 = 0.19$ | | | |
| $r_7 = -0.335$ | | | |
| $d_7 = 0.049$ | $n_4 = 1.68893$ | $\nu_4 = 31.08$ | |
| $r_8 = -1.518$ | | | |
| $d_8 = 0.077$ | $n_5 = 1.8061$ | $\nu_5 = 40.92$ | |
| $r_9 = -0.495$ | | | |
| $d_9 = 0.002$ | | | |
| $r_{10} = -5.346$ | | | |
| $d_{10} = 0.042$ | $n_6 = 1.734$ | $\nu_6 = 51.52$ | |
| $r_{11} = -0.629$ | | | |
| $f = 1, f_B = 0.736,$ | $\sum_{i=1}^{10} d_i = 0.534,$ | $\sum_{i=1}^{5} d_i = 0.174$ | |
| $f_{12} = 0.51,$ | $n_5 - n_4 = 0.11717$ | | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses for d-line reference, symbols $\nu_1$ through $\nu_6$ respectively represent Abbe's numbers of respective lenses for d-line, reference symbol f represents the focal length of the lens system as a whole, reference symbol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components.

6. A photographic lens system according to claim 1, in which said photographic lens system has the following numerical data:

| | | | |
|---|---|---|---|
| $r_1 = 0.535$ | | | |
| $d_1 = 0.057$ | $n_1 = 1.79952$ | $\nu_1 = 42.24$ | |
| $r_2 = 2.422$ | | | |
| $d_2 = 0.002$ | | | |
| $r_3 = 0.348$ | | | |
| $d_3 = 0.037$ | $n_2 = 1.8061$ | $\nu_2 = 40.92$ | |
| $r_4 = 0.485$ | | | |
| $d_4 = 0.030$ | | | |
| $r_5 = 0.827$ | | | |
| $d_5 = 0.023$ | $n_3 = 1.7847$ | $\nu_3 = 26.22$ | |
| $r_6 = 0.276$ | | | |
| $d_6 = 0.222$ | | | |

-continued

| | | |
|---|---|---|
| $r_7 = -0.311$ | | |
| $d_7 = 0.046$ | $n_4 = 1.68893$ | $\nu_4 = 31.08$ |
| $r_8 = -10.647$ | | |
| $d_8 = 0.076$ | $n_5 = 1.8061$ | $\nu_5 = 40.92$ |
| $r_9 = -0.406$ | | |
| $d_9 = 0.002$ | | |
| $r_{10} = -21.108$ | | |
| $d_{10} = 0.045$ | $n_6 = 1.734$ | $\nu_6 = 51.52$ |
| $r_{11} = -0.935$ | | |
| $f = 1, f_B = 0.751,$ | $\sum_{i=1}^{10} d_i = 0.54,$ | $\sum_{i=1}^{5} d_i = 0.149$ |
| $f_{12} = 0.521,$ | $n_5 - n_4 = 0.11717$ | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses for d-line, reference symbols $\nu_1$ through $\nu_6$ respectively represent Abbe's numbers of respective lenses for d-line, reference symbol f represents the focal length of the lens system as a whole, reference symbol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components.

7. A photographic lens system according to claim 1, in which said photographic lens system has the following numerical data:

| | | |
|---|---|---|
| $r_1 = 0.628$ | | |
| $d_1 = 0.066$ | $n_1 = 1.7859$ | $\nu_1 = 44.1$ |
| $r_2 = 5.287$ | | |
| $d_2 = 0.002$ | | |
| $r_3 = 0.374$ | | |
| $d_3 = 0.055$ | $n_2 = 1.7859$ | $\nu_2 = 44.1$ |
| $r_4 = 0.556$ | | |
| $d_4 = 0.026$ | | |
| $r_5 = 1.103$ | | |
| $d_5 = 0.031$ | $n_3 = 1.7847$ | $\nu_3 = 26.22$ |
| $r_6 = 0.298$ | | |
| $d_6 = 0.181$ | | |
| $r_7 = -0.310$ | | |
| $d_7 = 0.046$ | $n_4 = 1.68893$ | $\nu_4 = 31.08$ |
| $r_8 = -0.694$ | | |
| $d_8 = 0.074$ | $n_5 = 1.7859$ | $\nu_5 = 44.1$ |
| $r_9 = -0.423$ | | |
| $d_9 = 0.002$ | | |
| $r_{10} = -15.576$ | | |
| $d_{10} = 0.04$ | $n_6 = 1.6968$ | $\nu_6 = 55.52$ |
| $r_{11} = -0.693$ | | |
| $f = 1, f_B = 0.747,$ | $\sum_{i=1}^{10} D_i = 0.523,$ | $\sum_{i=1}^{5} d_i = 0.18$ |
| $f_{12} = 0.528,$ | $n_5 = n_4 = 0.09697$ | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses for d-line, reference symbols $\nu_1$ through $\nu_6$ respectively represent Abbe's numbers of respective lenses for d-line, reference symbol f represents the focal length of the lens system as a whole, reference symbol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components.

8. A photograhic lens system according to claim 1, in which said photographic lens system has the following numerical data:

| | | |
|---|---|---|
| $r_1 = 0.622$ | | |
| $d_1 = 0.061$ | $n_1 = 1.79952$ | $\nu_1 = 42.24$ |
| $r_2 = 3.373$ | | |
| $d_2 = 0.002$ | | |
| $r_3 = 0.338$ | | |
| $d_3 = 0.047$ | $n_2 = 1.79952$ | $\nu_2 = 42.24$ |
| $r_4 = 0.482$ | | |
| $d_4 = 0.026$ | | |
| $r_5 = 0.827$ | | |
| $d_5 = 0.021$ | $n_3 = 1.7847$ | $\nu_3 = 26.22$ |
| $r_6 = 0.281$ | | |
| $d_6 = 0.202$ | | |
| $r_7 = -0.32$ | | |
| $d_7 = 0.044$ | $n_4 = 1.68893$ | $\nu_4 = 31.08$ |
| $r_8 = -9.853$ | | |
| $d_8 = 0.073$ | $n_5 = 1.8061$ | $\nu_5 = 40.92$ |
| $r_9 = -0.409$ | | |
| $d_9 = 0.002$ | | |
| $r_{10} = -11.767$ | | |
| $d_{10} = 0.052$ | $n_6 = 1.757$ | $\nu_6 = 47.87$ |
| $r_{11} = -0.967$ | | |
| $f = 1, f_B = 0.751,$ | $\sum_{i=1}^{10} d_i = 0.53,$ | $\sum_{i=1}^{5} d_i = 0.157$ |
| $f_{12} = 0.532, n_5 - n_4 = 0.11717$ | | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses for d-line, reference symbols $\nu_1$ through $\nu_6$ respectively represent Abbe's numbers of respective lenses for d-line, reference symbol f represents the focal length of the lens system as a whole, reference symbol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components.

9. A photographic lens system according to claim 1, in which said photographic lens system has the following numerical data:

| | | |
|---|---|---|
| $r_1 = 1.1733$ | | |
| $d_1 = 0.0623$ | $n_1 = 1.80922$ | $\nu_1 = 39.62$ |
| $r_2 = 69.3990$ | | |
| $d_2 = 0.0023$ | | |
| $r_3 = 0.3825$ | | |
| $d_3 = 0.0449$ | $n_2 = 1.83932$ | $\nu_2 = 37.19$ |
| $r_4 = 0.7111$ | | |
| $d_4 = 0.0307$ | | |
| $r_5 = 1.3147$ | | |
| $d_5 = 0.0223$ | $n_3 = 1.74618$ | $\nu_3 = 28.29$ |
| $r_6 = 0.3059$ | | |
| $d_6 = 0.2762$ | | |
| $r_7 = -0.2793$ | | |
| $d_7 = 0.0228$ | $n_4 = 1.70443$ | $\nu_4 = 30.12$ |
| $r_8 = -0.7955$ | | |
| $d_8 = 0.0743$ | $n_5 = 1.80811$ | $\nu_5 = 46.57$ |
| $r_9 = -0.3599$ | | |
| $d_9 = 0.0023$ | | |
| $r_{10} = 5.0534$ | | |
| $d_{10} = 0.0600$ | $n_6 = 1.73234$ | $\nu_6 = 54.68$ |
| $r_{11} = -0.6303$ | | |
| $f = 1.0$, | $f_B = 0.8591$, | $\sum_{i=1}^{10} d_i = 0.5978$ |
| $\sum_{i=1}^{5} d_i = 0.1625$, | $f_{12} = 0.5720$, | $f_3 = -0.5390$ |
| $-f_3/f_{12} = 0.9423$, | $f_4 = -0.6220$ | |
| $f_{56} = 0.4287$, | $f_{56}/-f_4 = 0.6892$ | |
| $n_5 - n_4 = 0.10368$, | $r_4/r_5 = 05409$ | |
| $\epsilon_1 = 0.1013$, | $\epsilon_2 = 0.0951$ | | wherein reference symbols $r_1$ through $r_{11}$ respectively represent radii of curvature of respective lens surfaces, reference symbols $d_1$ through $d_{10}$ respectively represent thickness of respective lenses and airspaces between respective lenses, reference symbols $n_1$ through $n_6$ respectively represent refractive indices of respective lenses for e-line, reference symbols $\nu_1$ through $\nu_6$ respectively represent Abbe's numbers of respective lenses for e-line, reference symbol f represents the focal length of the lens system as a whole, reference symbol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components, reference symbol $f_{56}$ represents the total focal length of the lens on the image side in the fourth lens component and of the fifth lens component, reference symbol $\epsilon_1$ represents the distance from the secondary principal point of the first and second lens components to the primary principal point of the third lens component, and reference symbol $\epsilon_2$ represents the distance from the secondary principal point of the lens on the object side in the fourth lens component to the primary principal point of the lens on the image side in the fourth lens component and of the fifth lens component.

10. A photographic lens system according to claim 1, in which said photographic lens system has the following numerical data:

| | | |
|---|---|---|
| $r_1 = 1.0296$ | | |
| $d_1 = 0.0764$ | $n_1 = 1.81077$ | $\nu_1 = 40.95$ |
| $r_2 = -26.4109$ | | |
| $d_2 = 0.0023$ | | |
| $r_3 = 0.4071$ | | |
| $d_3 = 0.0456$ | $n_2 = 1.81077$ | $\nu_2 = 40.95$ |
| $r_4 = 0.7213$ | | |
| $d_4 = 0.0269$ | | |
| $r_5 = 2.3068$ | | |
| $d_5 = 0.0227$ | $n_3 = 1.70443$ | $\nu_3 = 30.12$ |
| $r_6 = 0.3311$ | | |
| $d_6 = 0.2426$ | | |
| $r_7 = -0.2981$ | | |
| $d_7 = 0.0227$ | $n_4 = 1.74618$ | $\nu_4 = 28.29$ |
| $r_8 = -1.0049$ | | |
| $d_8 = 0.0838$ | $n_5 = 1.79013$ | $\nu_5 = 44.18$ |
| $r_9 = -0.3617$ | | |
| $d_9 = 0.0023$ | | |
| $r_{10} = -17.5662$ | | |
| $d_{10} = 0.0523$ | $n_6 = 1.71615$ | $\nu_6 = 53.89$ |
| $r_{11} = -0.7886$ | | |
| $f = 1.0$, | $f_B = 0.8591$, | $\sum_{i=1}^{10} d_i = 0.5775$ |
| $\sum_{i=1}^{5} d_i = 0.1739$, | $f_{12} = 0.5770$, | $f_3 = -0.5510$ |
| $-f_3/f_{12} = 0.9549$, | $f_4 = -0.5760$ | |
| $f_{56} = 0.4137$, | $f_{56}/-f_4 = 0.7182$ | |
| $r_4/r_5 = 0.3129$, | $\epsilon_1 = 0.1026$ | |
| $\epsilon_2 = 0.0905$ | | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses for e-line, reference symbols $\nu_1$ through $\nu_6$ respectively represent Abbe's numbers of respective lenses for e-line, reference symbol f represents the focal length of the lens system as a whole, reference symbol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components, reference symbol $f_{56}$ represents the total focal length of the lens on the image side in the fourth lens component and of the fifth lens component, reference symbol $\epsilon_1$ represents the distance from the secondary principal point of the first and second lens components to the primary principal point of the third lens component, and reference symbol $\epsilon_2$ represents the distance from the secondary principal point of the lens on the object side in the fourth lens component to the primary principal point of the lens on the image side in the fourth lens component and of the fifth lens component.

11. A photographic lens system according to claim 1, in which said photographic lens system has the following numerical data:

$r_1 = 0.8774$
$\quad d_1 = 0.0909 \quad n_1 = 1.80811 \quad \nu_1 = 46.57$
$r_2 = 45.5773$
$\quad d_2 = 0.0023$
$r_3 = 0.4176$
$\quad d_3 = 0.0455 \quad n_2 = 1.80811 \quad \nu_2 = 46.57$
$r_4 = 0.6872$
$\quad d_4 = 0.0273$
$r_5 = 2.3074$
$\quad d_5 = 0.0228 \quad n_3 = 1.75453 \quad \nu_3 = 35.27$
$r_6 = 0.3454$
$\quad d_6 = 0.2275$
$r_7 = -0.2753$
$\quad d_7 = 0.0227 \quad n_4 = 1.74618 \quad \nu_4 = 28.29$
$r_8 = -0.7453$
$\quad d_8 = 0.0732 \quad n_5 = 1.79195 \quad \nu_5 = 47.43$
$r_9 = -0.3401$
$\quad d_9 = 0.0023$
$r_{10} = 23.5596$
$\quad d_{10} = 0.0566 \quad n_6 = 1.71615 \quad \nu_6 = 53.89$
$r_{11} = -0.7118$ $f = 1.0, \quad f_B = 0.8590, \quad \sum_{i=1}^{10} d_i = 0.5719$ $\sum_{i=1}^{5} d_i = 0.1881, \quad f_{12} = 0.585, \quad f_3 = -0.5410$ $-f_3/f_{12} = 0.9248, \quad f_4 = -0.5970$
$f_{56} = 0.4169, \quad f_{56}/-f_4 = 0.6983$
$n_5 - n_4 = 0.04577, \quad r_4/r_5 = 0.2978$
$\epsilon_1 = 0.1115, \quad \epsilon_2 = 0.0918$ wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses for e-line, reference symbols $\nu_1$ through $\nu_6$ respectively represent Abbe's numbers of respective lenses for e-line, reference symbol f represents the focal length of the lens system as a whole, reference symbol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components, reference symbol $f_{56}$ represents the total focal length of the lens on the image side in the fourth lens component and of the fifth lens component, reference symbol $\epsilon_1$ represents the distance from the secondary principal point of the first and second lens components to the primary principal point of the third lens component, and reference symbol $\epsilon_2$ represents the distance from the secondary principal point of the lens on the object side in the fourth lens component to the primary principal point of the lens on the image side in the fourth lens omponent and of the fifth lens component.

12. A photographic lens system according to claim 1, in which said photographic lens system has the following numerical data:

$r_1 = 0.9182$
$\quad d_1 = 0.0497 \quad n_1 = 1.80922 \quad \nu_1 = 39.62$
$r_2 = 9.0961$
$\quad d_2 = 0.0022$
$r_3 = 0.3759$
$\quad d_3 = 0.0542 \quad n_2 = 1.83932 \quad \nu_2 = 37.19$
$r_4 = 0.5991$
$\quad d_4 = 0.0241$
$r_5 = 1.2475$
$\quad d_5 = 0.0216 \quad n_3 = 1.76843 \quad \nu_3 = 27.11$
$r_6 = 0.3211$
$\quad d_6 = 0.2182$
$r_7 = -0.2958$
$\quad d_7 = 0.0222 \quad n_4 = 1.70443 \quad \nu_4 = 30.12$
$r_8 = -3.9426$
$\quad d_8 = 0.0862 \quad n_5 = 1.80401 \quad \nu_5 = 42.24$
$r_9 = -0.3745$
$\quad d_9 = 0.0022$
$r_{10} = 98.8977$
$\quad d_{10} = 0.0322 \quad n^6 = 1.76076 \quad \nu_6 = 47.87$
$r_{11} = -0.9124$ $f = 1.0, \quad f_B = 0.8399, \quad \sum_{i=1}^{10} d_i = 0.5139$ $\sum_{i=1}^{5} d_i = 0.1518, \quad f_{12} = 0.5790$ $f_3 = -0.568, \quad -f_3/f_{12} = 0.9810$
$f_4 = -0.455, \quad f_{56} = 0.3599$
$f_{56}/-f_4 = 0.7910, \quad n_5 - n_4 = 0.09958$
$r_4/r_5 = 0.4802, \quad \epsilon_1 = 0.1064$
$\epsilon_2 = 0.0712$ wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses for e-line, reference symbols $\nu_1$ through $\nu_6$ respectively represent Abbe's numbers of respective lenses for e-line, reference symbol f represents the focal length of the lens system as a whole, reference symbol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components, reference symbol $f_{56}$ represents the total focal length of the lens on the image side in the fourth lens component and of the fifth lens component, reference symbol $\epsilon_1$ represents the distance from the secondary principal point of the first and second lens components to the primary principal point of the third lens component, and reference symbol $\epsilon_2$ represents the distance from the secondary principal point of the lens on the object side in the fourth lens component to the primary principal point of the lens on the image side in the fourth lens component and of the fifth lens component.

13. A photographic lens system according to claim 1, in which said photographic lens system has the following numerical data:

$r_1 = 0.5886$
$\quad d_1 = 0.0700 \quad n_1 = 1.80922 \quad \nu_1 = 39.62$
$r_2 = 2.1104$
$\quad d_2 = 0.0020$
$r_3 = 0.3385$
$\quad d_3 = 0.0444 \quad n_2 = 1.83945 \quad \nu_2 = 42.72$
$r_4 = 0.4748$
$\quad d_4 = 0.0256$
$r_5 = 0.7149$
$\quad d_5 = 0.0195 \quad n_3 = 1.79177 \quad \nu_3 = 26.22$
$r_6 = 0.2678$
$\quad d_6 = 0.2500$
$r_7 = -0.2793$
$\quad d_7 = 0.0189 \quad n_4 = 1.70443 \quad \nu_4 = 30.12$
$r_8 = -4.7249$
$\quad d_8 = 0.0873 \quad n_5 = 1.80922 \quad \nu_5 = 39.62$
$r_9 = -0.3486$
$\quad d_9 = 0.0020$
$r_{10} = 62.2371$
$\quad d_{10} = 0.0328 \quad r_6 = 1.76076 \quad \nu_6 = 47.87$
$r_{11} = -1.0361$ $f = 0.1, \quad f_B = 0.7565, \quad \sum_{i=1}^{10} d_i = 0.5524$ $\sum_{i=1}^{5} d_i = 0.1615, \quad f_{12} = 0.5470, \quad f_3 = 0.551$ $-f_3/f_{12} = 1.0073, \quad f_4 = 0.422$
$f_{56} = 0.3462, \quad f_{56}/-f_4 = 0.8204$
$n_5 - n_4 = 0.10479, \quad r_4/r_5 = 0.6641$
$\epsilon_1 = 0.1178, \quad \epsilon_2 = 0.0677$ wherein reference symbols $r_1$ through $r_{11}$ respectively represent radii of curvatuve of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses for e-line, reference symbols $\nu_1$ through $\nu_6$ respectively represent Abbe's numbers of respective lenses for e-line, reference symbol f represents the focal length of the lens system as a whole, reference symbol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components, reference symbol $f_{56}$ represents the total focal length of the lens on the image side in the fourth lens component and of the fifth lens component, reference symbol $\epsilon_1$ represents the distance from the secondary principal point of the first and second lens components to the primary principal point of the third lens component, and reference symbol $\epsilon_2$ represents the distance from the secondary principal point of the lens on the object side in the fourth lens component to the primary principal point of the lens on the image side in the fourth lens component and of the fifth lens component.

14. A photographic lens system according to claim 1, in which said photographic lens system has the following numerical data:

$r_1 = 0.5715$
$\quad d_1 = 0.0894 \quad n_1 = 1.81077 \quad \nu_1 = 40.95$
$r_2 = 2.5341$
$\quad d_2 = 0.0020$
$r_3 = 0.3809$
$\quad d_3 = 0.0468 \quad n_2 = 1.81077 \quad \nu_2 = 40.95$
$r_4 = 0.5125$
$\quad d_4 = 0.0291$
$r_5 = 1.0418$
$\quad d_5 = 0.0204 \quad n_3 = 1.79192 \quad \nu_3 = 25.71$
$r_6 = 0.3070$
$\quad d_6 = 0.2184$
$r_7 = -0.3060$
$\quad d_7 = 0.0212 \quad n_4 = 1.70443 \quad \nu_4 = 30.12$
$r_8 = -7.3319$
$\quad d_8 = 0.1014 \quad n_5 = 1.81077 \quad \nu_5 = 40.95$
$r_9 = -0.3949$
$\quad d_9 = 0.0020$
$r_{10} = 2.9394$
$\quad d_{10} = 0.0453 \quad n_6 = 1.76076 \quad \nu_6 = 47.87$
$r_{11} = -1.3192$ $f = 1.0, \quad f_B = 0.7560, \quad \sum_{i=1}^{10} d_i = 0.5759$ $\sum_{i=1}^{5} d_i = 0.1877, \quad f_{12} = 0.5700 \quad f_3 = -0.556$ $-f_3/f_{12} = 0.9754, \quad f_4 = -0.454$
$f_{56} = 0.3623, \quad f_{56}/-f_4 = 0.7980$
$n_5 - n_4 = 0.10634, \quad r_4/r_5 = 0.4919$
$\epsilon_1 = 0.1322, \quad \epsilon_2 = 0.0768$ wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses for e-line, reference symbols $\nu_1$ through $\nu_6$ respectively represent Abbe's numbers of respective lenses for e-line, reference symbol f represents the focal length of the lens system as a whole, reference sybol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components, reference symbol $f_{56}$ represents the total focal length of the lens on the image side in the fourth lens component and of the fifth lens component, reference symbol $\epsilon_1$ represents the distance from the secondary principal point of the lens on the object side in the fourth lens component to the primary principal point of the lens on the image side in the fourth lens component and of the fifth lens component.

15. A photographic lens system according to claim 1, in which said photographic lens system has the following numerical data:

| | | |
|---|---|---|
| $r_1 = 0.8965$ | | |
| $d_1 = 0.0820$ | $n_1 = 1.80922$ | $\nu_1 = 39.62$ |
| $r_2 = 27.8344$ | | |
| $d_2 = 0.0022$ | | |
| $r_3 = 0.4067$ | | |
| $d_3 = 0.0509$ | $n_2 = 1.80401$ | $\nu_2 = 42.24$ |
| $r_4 = 0.6499$ | | |
| $d_4 = 0.0309$ | | |
| $r_5 = 2.0122$ | | |
| $d_5 = 0.0242$ | $n_3 = 1.72734$ | $\nu_3 = 29.24$ |
| $r_6 = 0.3342$ | | |
| $d_6 = 0.2196$ | | |
| $r_7 = -0.3022$ | | |
| $r_7 = 0.0227$ | $n_4 = 1.74618$ | $\nu_4 = 28.29$ |
| $r_8 = -1.6884$ | | |
| $d_9 = 0.0833$ | $n_5 = 1.80922$ | $\nu_5 = 39.62$ |
| $r_9 = -0.3945$ | | |
| $d_9 = 0.0022$ | | |
| $r_{10} = \infty$ | | |
| $d_{10} = 0.0556$ | $n_6 = 1.71615$ | $\nu_6 = 53.89$ |
| $r_{11} = -0.6647$ | | |
| $f = 1.0$, | $f_B = 0.8400$, | $\sum_{i=1}^{10} d_i = 0.5736$ |
| $\sum_{i=1}^{5} d_i = 0.1902$, | $f_{12} = 0.5990$, | $f_3 = 0.558$ |
| $-f_3/f_{12} = 0.9316$, | $f_4 = -0.501$ | |
| $f_{56} = 0.3762$, | $f_{56}/-f_4 = 0.7509$ | |
| $n_5 - n_4 = 0.06304$, | $r_4/r_5 = 0.3230$ | |
| $\epsilon_1 = 0.1200$, | $\epsilon_2 = 0.0829$ | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses for e-line, reference symbols $\nu_1$ through $\nu_6$ respectively represent Abbe's numbers of respective lenses for e-line, reference symbol f represents the focal length of the lens system as a whole, reference symbol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components, reference symbol $f_{56}$ represents the total focal length of the lens on the image side in the fourth lens component and of the fifth lens component, reference symbol $\epsilon_1$ represents the distance from the secondary principal point of the first and second lens components to the primary principal point of the third lens component and reference symbol $\epsilon_2$ represents the distance from the secondary principal point of the lens on the object side in the fourth lens component to the primary principal point of the lens on the image side in the fourth lens component and of the fifth lens component.

16. A photographic lens system according to claim 1, in which said photographic lens system has the following numerical data:

| | | |
|---|---|---|
| $r_1 = 0.7303$ | | |
| $d_1 = 0.0592$ | $n_1 = 1.83932$ | $\nu_1 = 37.19$ |
| $r_2 = 7.5746$ | | |
| $d_2 = 0.0022$ | | |
| $r_3 = 0.4184$ | | |
| $d_3 = 0.0477$ | $n_2 = 1.83932$ | $\nu_2 = 37.19$ |
| $r_4 = 0.6068$ | | |
| $d_4 = 0.0303$ | | |
| $r_5 = 1.8122$ | | |
| $d_5 = 0.0240$ | $n_3 = 1.79192$ | $\nu_3 = 25.71$ |
| $r_6 = 0.3432$ | | |
| $d_6 = 0.2194$ | | |
| $r_7 = -0.3075$ | | |
| $d_7 = 0.0322$ | $n_4 = 1.723.11$ | $\nu_4 = 29.51$ |
| $r_8 = -1.2595$ | | |
| $d_8 = 0.0800$ | $n_5 = 1.79013$ | $\nu_5 = 44.18$ |
| $r_9 = -0.4037$ | | |
| $d_9 = 0.0022$ | | |
| $r_{10} = -50.5607$ | | |
| $d_{10} = 0.0582$ | $n_6 = 1.75844$ | $\nu_6 = 52.33$ |
| $r_{11} = -0.7067$ | | |
| $f = 1.0$, | $f_B = 0.8385$, | $\sum_{i=1}^{10} d_i = 0.556$ |
| $\sum_{i=1}^{5} d_i = 0.1634$, | $f_{12} = 0.5710$, | $f_3 = -0.539$ |
| $-f_3/f_{12} = 0.9440$, | $f_4 = -0.571$ | |
| $f_{56} = 0.4131$, | $f_{56}/-f_4 = 0.7235$ | |
| $n_5 - n_4 = 0.06702$, | $r_4/r_5 = 0.3348$ | |
| $\epsilon_1 = 0.1136$, | $\epsilon_2 = 0.0951$ | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses for e-line, reference symbols $\nu_1$ through $\nu_6$ respectively represent Abbe's numbers of respective lenses for e-line, reference symbol f represents the focal length of the lens system as a whole, reference symbol $f_B$ represents the back focal length of the lens system, reference symbol $$\sum_{i=1}^{10} d_i$$

represents the overall length of the lens system, reference symbol $$\sum_{i=1}^{5} d_i$$

represents the length from the surface on the object side of the first lens component to the surface on the image side of the third lens component, reference symbol $f_{12}$ represents the total focal length of the first and second lens components, reference symbol $f_{56}$ represents the total focal length of the lens on the image side in the fourth lens component and of the fifth lens component, reference symbol $\epsilon_1$ represents the distance from the secondary principal point of the first and second lens components to the primary principal point of the third lens component, and reference symbol $\epsilon_2$ represents the distance from the secondary principal point of the lens on the object side in the fourth lens component to the primary principal point of the lens on the image side in the fourth lens component and of the fifth lens component.

* * * * *